United States Patent [19]

Miyashita

[11] Patent Number: 5,574,439
[45] Date of Patent: Nov. 12, 1996

[54] PAGING RECEIVER WHICH DISPLAYS CANNED AND GENERAL MESSAGES

[75] Inventor: Mafumi Miyashita, Tokyo, Japan

[73] Assignee: NEC Corporation, Japan

[21] Appl. No.: 7,142

[22] Filed: Jan. 21, 1993

[30] Foreign Application Priority Data

Jan. 20, 1992 [JP] Japan .................................. 4-007855

[51] Int. Cl.⁶ ......................................... G08B 5/22
[52] U.S. Cl. .................................. 340/825.440; 455/38.1
[58] Field of Search ...................... 340/825.44; 455/38.1, 455/38.4, 38.5

[56] References Cited

U.S. PATENT DOCUMENTS

| | | | |
|---|---|---|---|
| 4,336,524 | 6/1982 | Levine | 455/38.4 |
| 4,618,860 | 10/1986 | Mori | 340/825.44 |
| 4,660,032 | 4/1987 | Tsunoda | 340/825.44 |
| 4,839,641 | 6/1989 | Mori et al. | 340/825.47 |
| 5,066,949 | 11/1991 | Breeder et al. | 340/825.44 |

FOREIGN PATENT DOCUMENTS

| | | | |
|---|---|---|---|
| 3-42923 | 2/1991 | Japan | 455/38.4 |

*Primary Examiner*—Michael Horabik
*Assistant Examiner*—Edward Merz
*Attorney, Agent, or Firm*—Ostrolenk, Faber, Gerb & Soffen, LLP

[57] ABSTRACT

A paging receiver having a conversion table for storing plural canned messages. In the receiver, when a space data is included in one of the first predetermined figures of a received signal, data preceding the space data is determined as a conversion code. The conversion code is converted to a corresponding canned message in the conversion table. Information including the canned message and a general message following the space data of the received signal is displayed.

14 Claims, 4 Drawing Sheets

FIG. 4

TRANSMISSION REQUEST DATA

| 1 | 2 |
|---|---|

RECEIVED DATA

| 1 | 2 | ␣ | ␣ | ␣ |
|---|---|---|---|---|

⎵ SPACE

DISPLAYED MESSAGE

| 0 | 1 | 2 | 3 | — | 4 | 5 | — | 6 | 7 | 8 | 9 | ␣ |
|---|---|---|---|---|---|---|---|---|---|---|---|---|

5,574,439

PAGING RECEIVER WHICH DISPLAYS CANNED AND GENERAL MESSAGES

FIELD OF THE INVENTION

This invention relates to a paging receiver, and more particularly, to a paging receiver with a display function.

BACKGROUND OF THE INVENTION

A recently introduced paging receiver is provided with a display function to show a received message such as a telephone number of the caller, a telephone number of a voice mail, etc.

A first conventional paging receiver includes a display device which displays the entire all content of a message received by the receiver. However, when using this paging takes a long time to transmit a long message to the receiver since the entire message to be displayed must be transmitted.

A second conventional paging receiver is provided with a conversion table storing a plurality of canned (prestored) messages. One type of the second conventional paging receiver includes a detector for detecting a predetermined code in a received signal. The predetermined code identifies the paging receiver in question. In the paging receiver, data following the detected code is converted to a corresponding canned message stored in the conversion table, and the canned message is displayed.

Another type of the second conventional paging receiver includes a detector for detecting a specific code in a received signal. In the paging receiver, the mode of operation changes to a conversion mode when the specific code is detected thereby. In the conversion mode, the received signal is converted to a corresponding canned message.

According to the second conventional paging receiver, however, there is a disadvantage in that it is complicated to convert the received signal to a canned message, so that the paging receiver becomes impractical.

A third conventional paging receiver includes a conversion circuit for converting a word data of the first figure in a received signal to canned message corresponding to the word data. Then, the canned message is displayed. According to the third conventional paging receiver, however, there is a disadvantage in that a general message can not be displayed when the canned message is displayed.

SUMMARY OF THE INVENTION

Accordingly, it is an object of the invention to provide a paging receiver in which a conversion code can be converted to a corresponding canned message easily, despite the fact that both of a canned message and a general message can be displayed simultaneously.

According to the invention, a paging receiver includes:
  means for receiving a transmitted signal to provide a received signal, said received signal including a call signal and a message signal, said message signal having a plurality of characters defining a conversion code and a space code;
  means for comparing said call signal to an identification number of said paging receiver and for providing a coincidence signal when said call signal corresponds to said identification number;
  means for storing a plurality of predetermined messages, each associated with a respective conversion code;
  means responsive to the generation of said coincidence signal for:
    (1) determining whether any one of a predetermined subset of said characters is said space code; and, if so,
    (2) displaying that one of said predetermined messages identified by received conversion code.

The other objects and features of the invention will become understood from the following description with reference to the accompanying drawings.

BRIEF DESCRIPTION OF THE DRAWINGS

FIGS. 2 and 4 are schematic views used for explaining operation of the preferred embodiment, respectively.

DESCRIPTION OF THE PREFERRED EMBODIMENTS

Figure 1:
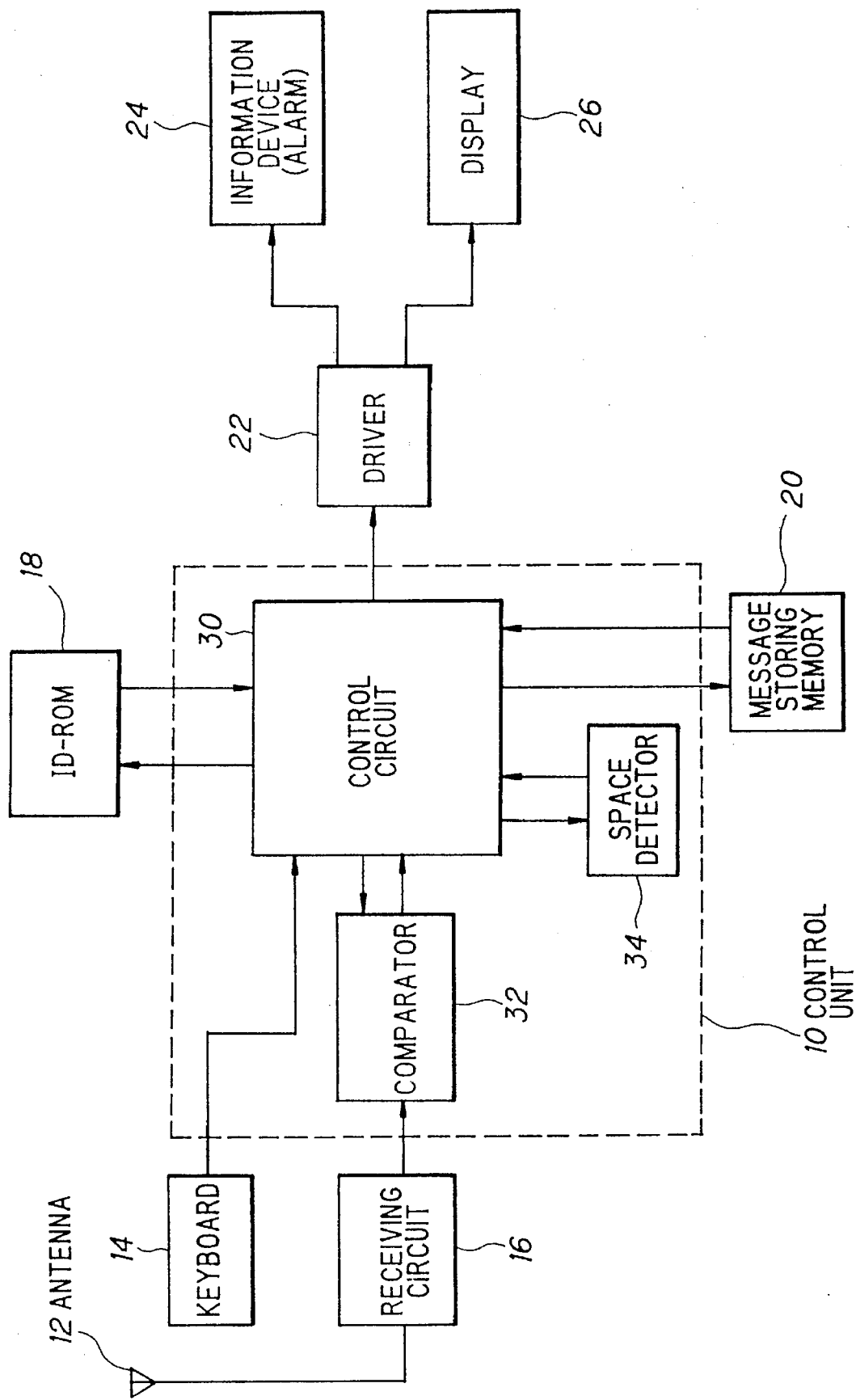
FIG. 1 is a block diagram showing a paging receiver of a preferred embodiment according to the invention.

FIG. 1 shows a paging receiver of a preferred embodiment according to the invention, which receives a signal transmitted from a paging transmitter. The paging receiver includes a control unit 10, an antenna 12 for receiving a transmitted signal which includes both a call signal and a message signal, a keyboard 14 connected to the control unit 10 for supplying predetermined data thereto, a receiving circuit 16 connected to the antenna 12, an ID-ROM 18 connected to the control unit 10, a message storing memory 20 connected to the control unit 10, a driver 22 connected to the control unit 10, an information device 24 connected to the driver to be driven thereby, and a display 26 connected to the driver 22 to be driven thereby.

The receiving circuit 16 demodulates a signal modulated on a carrier signal received by the antenna 12 to produce a call signal and a message signal. The ID-ROM 18 stores a conversion table 38 shown in FIG. 2, a predetermined program and an ID number for the paging receiver. Such information stored in the ID-ROM may be modified and new information may be added thereto by an operator using the keyboard 14.

The control unit 10 includes a control circuit 30 connected to the keyboard 14, the ID-ROM 18, the message storing memory 20 and the driver 22 to control them, respectively, a comparator 32 connected to the receiving circuit 16 and the control circuit 30, and a space detector 34 connected to the control circuit 30.

The comparator 32 compares the call number included in a received signal to the ID number stored in the ID-ROM, and supplies a coincidence signal to the control circuit 30 when the received call number is coincident to the ID number. This indicates that the received signal is intended for this paging receiver. The space detector 34 detects whether a space data is present in the first three characters of a received data $D_M$.

The conversion table 38 stored in the ID-ROM 18 includes a plurality of canned messages corresponding to a plurality of conversion codes.

Figure 2:
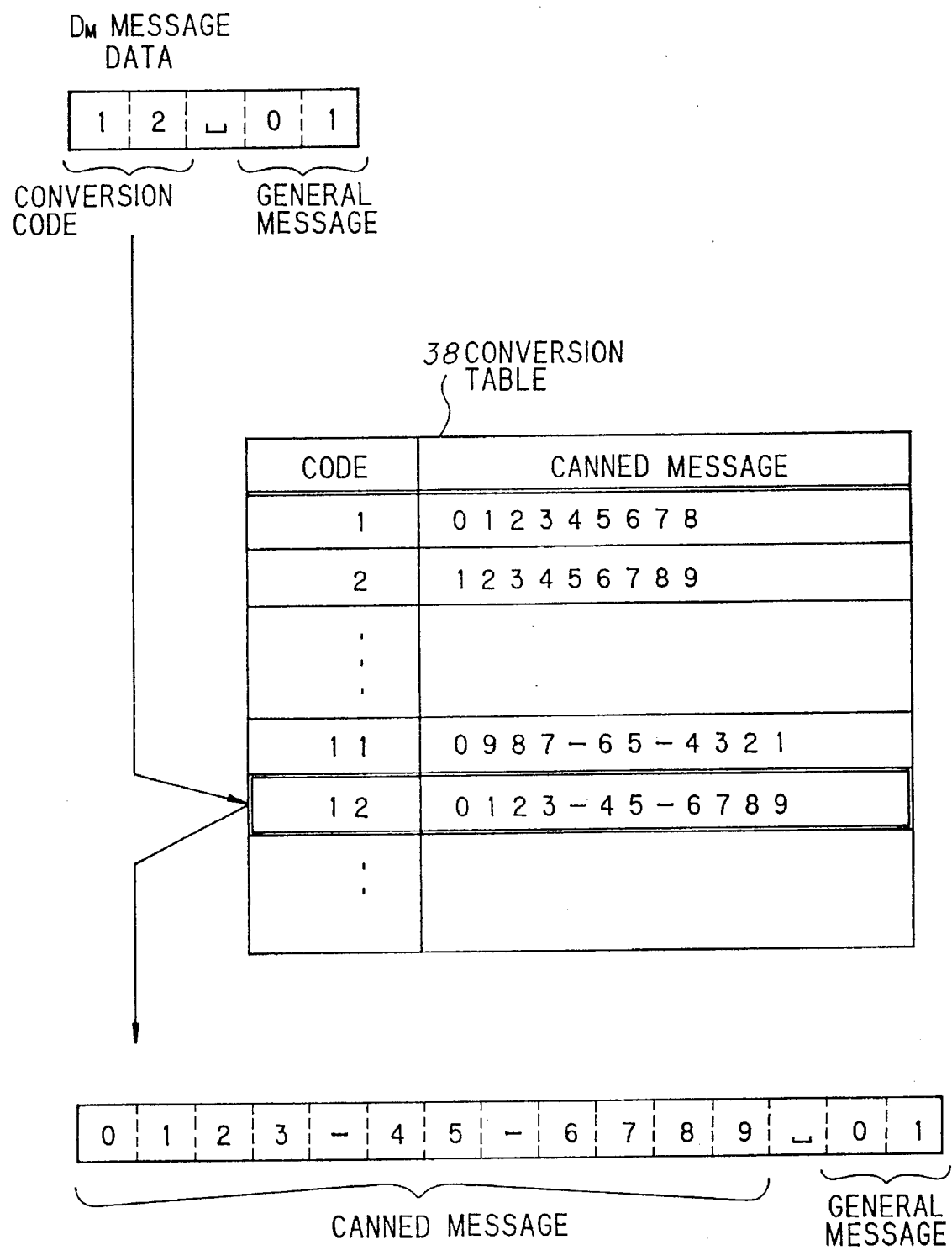

Next, operation of the preferred embodiment will be explained in conjunction with FIGS. 2 and 3. When a message signal is transmitted from paging transmitter, the signal is received at the antenna 12 of the paging receiver. Part of the received signal is shown in FIG. 2 as a message signal including a two character conversion code "12", a one character space data "_", and a two character general message "01", which are generated by pressing key buttons of the transmitter, for example, the space data is generated by pressing buttons of an asterisk "*" and "2". The message signal is generated by CCIR (Comité Consulatif International des Radiocommunications) No.1 as one block having five characters, each character having four bits.

when the transmitted signal is received at the antenna 12, the received signal is supplied to the receiving circuit 16, and the received signal is demodulated to provide the call signal (an identification signal) and the above described message signal. Then, the modulated signal is supplied to the comparator 32, and the call signal is compared to the ID number stored in the ID-ROM 18. At this time, if the call signal is coincident to the ID number, a coincidence signal is supplied to the control circuit 30.

When the coincidence signal is supplied to the control circuit 30, the space data of the third character in the message data $D_M$ is checked by the space detector 34. When it is detected that the space data is present therein, data "12" preceding the space data is determined as a conversion code and data following the space data "01" is determined to be a general message. If a space data is not detected by the space detector 34, all message data is determined to be a general message.

In response to the conversion code "12", a canned message "0123-45-6789" corresponding to the conversion code "12" is read from the conversion table 38 of the ID-ROM 18 by the control circuit 30. The canned message "0123-45-6789" is combined with the general message "01" to generate a complete message "0123-45-6789_01", and the complete message "0123-456789_01" is supplied to the message storing memory 20 to be stored therein.

After that, the complete message "0123-456789_01" is supplied from the message storing memory 20 through the control circuit 30 to the driver 22. Then, the message is supplied to the display 26 and the information circuit 24, so that the message "0123-456789_01" is displayed by the display 26 and a predetermined alarm is generated by the information circuit 24.

Otherwise, if the received data does not include a conversion code, or the conversion table 38 does not have data corresponding to the conversion code, the received data is displayed directly without conversion by the display 26.

Figure 3:
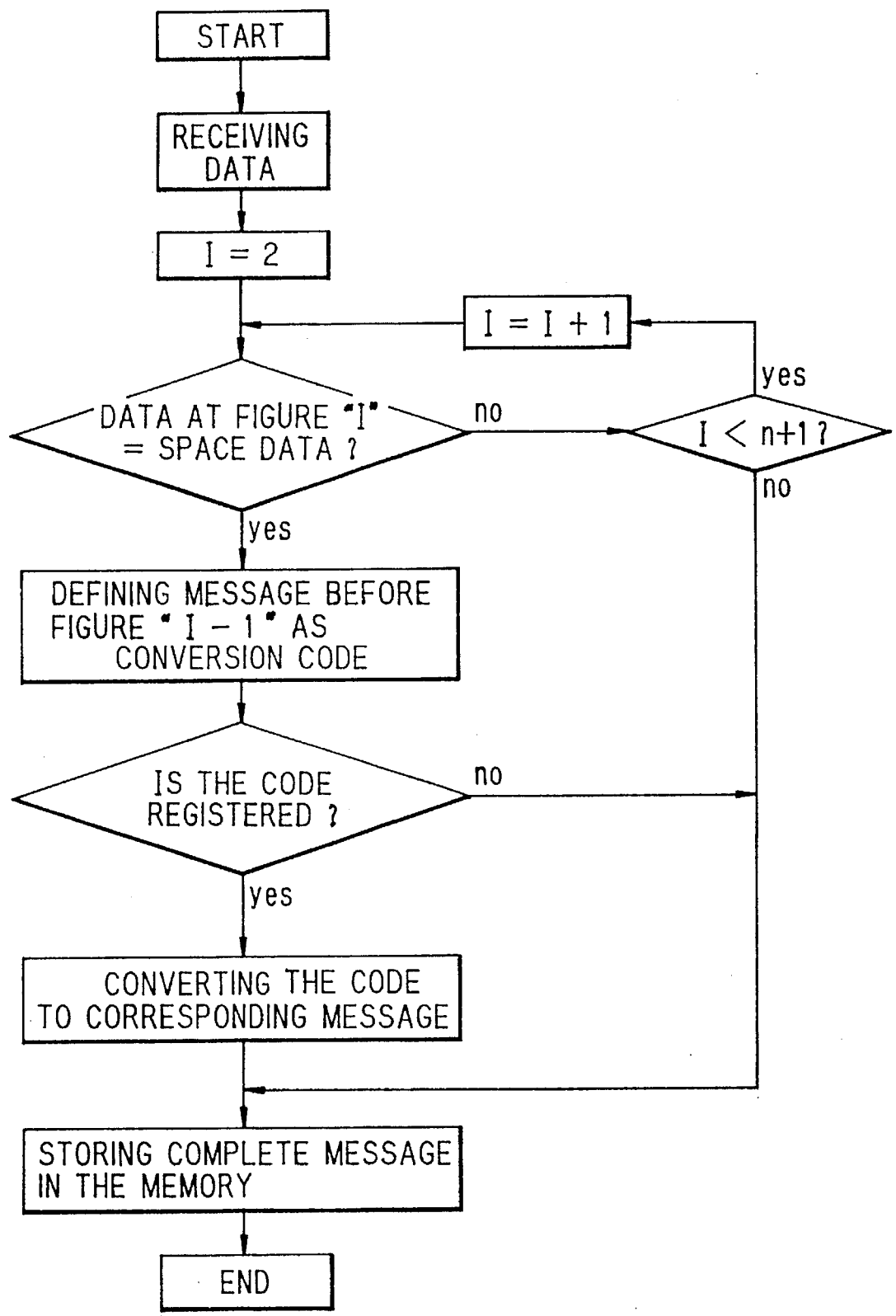
FIG. 3 is a flow chart showing operation of the first preferred embodiment.

In FIG. 3, a second character (I=2) of a received signal is checked as to whether the character is a space code or not. When the character is the space code, the above described conversion sequence starts to provide a converted message. On the other hand, when the character is not the space data, the third character (I=I+1) of the received signal is checked in the same manner, so that the same control is carried out. Here, if it is assumed that a number "n" is 3, a fourth figure of the received data is no longer checked, because the relation of "I<n+1" is not met.

FIG. 4 shows another case in which a transmitting data includes only a conversion code "12" therein. When only a conversion code "12" is instructed to be transmitted in a transmitter (not shown), a signal of "12_" is generated therein to be transmitted to the paging receiver.

In the receiver, the first space code next to character "2" is detected by the space detector 34, so that data "12" is determined to be conversion data. Therefore, only canned message "0123-45-6789" corresponding to the conversion code "12" is displayed by the display 26.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A paging receiver, comprising:
    (a) means for receiving a transmitted signal to provide a received signal, said received signal including a call signal and a message signal, said message signal having a plurality of characters selectively defining a conversion code and/or a space code and/or a general message;
    (b) means for comparing said call signal to an identification number of said paging receiver and for providing a coincidence signal when said call signal corresponds to said identification number;
    (c) means for storing a plurality of predetermined messages, each associated with a respective conversion code; and
    (d) means responsive to the generation of said coincidence signal for:
        (1) determining whether any one of a predetermined subset of said plurality of characters is said space code; and, if so,
        (2) displaying that one of said predetermined messages identified by said conversion code in said received signal and said general message.

2. A paging receiver, comprising:
    (a) means for receiving a transmitted signal to provide a received signal, said received signal including a call signal and a message signal, said message signal having a plurality of characters defining a conversion code and a space
    (b) means for comparing said call signal to an identification number of said paging receiver and for providing a coincidence signal when said call signal corresponds to said identification number;
    (c) means for storing a plurality of predetermined messages, each associated with a respective conversion code; and
    (d) means responsive to the generation of said coincidence signal for:
        (1) determining Whether any one of a predetermined subset of said plurality of characters is said space code; and, if so,
        (2) displaying that one of said predetermined messages identified by said conversion code in said received signal;
    wherein said message signal also includes a general code and said means responsive to said coincidence signal also displays said general code.

3. A paging receiver, according to claim 1, wherein said predetermined subset of characters is the second through n th character, n being an integer greater than 1.

4. A paging receiver for processing a received signal of the type which includes a conversion code, followed by a space code followed by a general message, the receiver comprising:
    means for storing a plurality of predetermined messages, each corresponding to a respective conversion codes;
    means for detecting the presence of space data in one of a predetermined subset of characters in a signal received by said paging receiver;
    means for determining that the characters preceding the detected space data are a received conversion code and that the characters following said detected space data are a received general message; and means for displaying that predetermined message identified by said received conversion code and said general message.

5. A paging receiver for processing a received signal of the type which includes a conversion code, followed by a space code followed by a general message, the paging receiver comprising:

means for storing a plurality of predetermined messages, each corresponding to a respective conversion codes;

means for detecting the presence of space data in one of a predetermined subset of characters in a signal received by said paging receiver;

means for determining that the characters preceding the detected space data are a received conversion code and that the characters following said detected space data are a received general message;

means for displaying that predetermined message identified by said received conversion code and said general message; and wherein said conversion code, said predetermined messages and said general message are numerical data.

6. A process for displaying a message received by a paging receiver, said process comprising the steps of:

(a) receiving a transmitted signal to provide a received signal, said received signal including a call signal and a message signal, said message signal having a plurality of characters selectively defining a conversion code and/or a space code and/or a general message;

(b) comparing said call signal to an identification number of said paging receiver and providing a coincidence signal when said call signal corresponds to said identification number;

(c) storing a plurality of predetermined messages, each associated with a respective conversion code; and (d) determining whether any one of a predetermined subset of said characters is said space code; and, if so, displaying that one of said predetermined messages identified by said received conversion code and displaying said general message when present.

7. A process for displaying a message received by a paging receiver, said process comprising the steps of:

(a) receiving a transmitted signal to provide a received signal, said received signal including a call signal and a message signal, said message signal having a plurality of characters defining a conversion code and a space code;

(b) comparing said call signal to an identification number of said paging receiver and providing a coincidence signal when said call signal corresponds to said identification number;

(c) storing a plurality of predetermined messages, each associated with a respective conversion code; and (d) determining whether any one of a predetermined subset of said characters is said space code; and, if so, displaying that one of said predetermined messages identified by said received conversion code; and wherein said message signal also includes a general code and said displaying step includes the step of displaying said general code.

8. The process according to claim 6, wherein said predetermined subset of said characters is the second through n th character, n being an integer greater than 2.

9. A process for displaying a message received by a paging receiver, said process comprising the steps of:

storing a plurality of predetermined messages, each corresponding to a respective conversion code;

detecting a presence of space data in one of a predetermined subset of characters in a signal received by said pager;

determining that the characters preceding the detected space data are a received conversion code and that the characters following said detected space data are a received general message; and displaying that predetermined message identified by said received conversion code and said received general message.

10. A process for displaying a message received by a paging receiver, said process comprising the steps of:

storing a plurality of predetermined messages, each corresponding to a respective conversion code;

detecting a presence of space data in one of a predetermined subset of characters in a signal received by said paging receiver;

determining that the characters preceding the detected space data are a received conversion code and that the characters following said detected space data are a received general message;

displaying that predetermined message identified by said received conversion code and said received general message; and wherein said received conversion code, said predetermined messages and said general message are numerical data.

11. A process for displaying a selected one of a plurality of stored messages in response to the receipt of a transmitted message signal of the type which includes a general message and a plurality of characters, each stored message being associated with a respective conversion code, said process comprising the steps of:

(1) examining the received message signal to determine if one or more of a predetermined subset of said plurality of characters is a space code, and, if so;

(b) determining that at least one character of said message signal, whose location is determined by the location of said space code, defines a received conversion code; and (c) displaying the stored message identified by the received conversion code and said general message.

12. The process of claim 11, wherein said plurality of characters are located in front of said space code.

13. A process for displaying a selected one of a plurality of stored messages in response to the receipt of a transmitted message signal of the type which includes a plurality of characters, each stored message being associated with a respective conversion code, said process comprising the steps of:

(a) examining the received message signal to determine if one or more of a predetermined subset of said characters is a space code, and, if so;

(b) determining that at least one character of said message signal, whose location is determined by the location of said space code, defines a received conversion code; and (c) displaying the stored message identified by the received conversion code; and wherein said determining step also determines that at least other characters of said message signal whose location is determined by the location of said space code defines a general message signal and said displaying step includes the step of displaying said general message signal.

14. A method for displaying a message received by a paging receiver, said message being of the type having a plurality of characters, said method comprising the steps of:

(a) determining whether said message includes a conversion code and/or a general message as a function of the presence or absence of a space code at one or more predefined characters in said message;

(b) displaying a prestored message identified by said conversion code if it is determined that said received message includes a conversion code;

(c) displaying said general message if it is determined that said received message includes a general message; and (d) displaying both the prestored message and the general message if it is determined that said message includes said conversion code and said general message.

* * * * *